Patented Feb. 9, 1932

1,844,862

UNITED STATES PATENT OFFICE

ARTHUR L. MOHLER, OF WILMINGTON, DELAWARE, ASSIGNOR TO HERCULES POWDER COMPANY, OF WILMINGTON, DELAWARE, A CORPORATION OF DELAWARE

METHOD OF PRODUCING HYDRATED METAL NITRATES

No Drawing.  Application filed October 1, 1927.  Serial No. 223,484.

My invention relates to a method of producing hydrated nitrates, as, for example, magnesium nitrate, calcium nitrate, ferric nitrate, aluminum nitrate and the like.

Hydrated nitrates have been heretofore produced by dissolving an oxide, a carbonate or the like of a metal in dilute nitric acid, or by double decomposition of soluble salts of metals with water, with subsequent evaporation of the excess water until the nitrate crystallizes out from the solution. Such methods of producing hydrated nitrates involve considerable difficulty and are uneconomic since in the evaporation of the excess water the containers, steam coils, etc., are damaged by corrosion.

Now in accordance with my invention, I have discovered that hydrated nitrates may be produced without the necessity for evaporating any water, it being only necessary that the nitrate when formed be cooled to effect crystallization.

The method in accordance with my invention involves the admixture of nitric acid with a metal salt in quantity just sufficient to neutralize the nitric acid, the nitric acid being dissolved in an amount of water just sufficient to supply the water of crystallization of the hydrated nitrate formed by the reaction.

As an example of the carrying out of the method according to my invention, for the production say of magnesium nitrate, I may utilize magnesium oxide, magnesium hydroxide, magnesium carbonate, or other equivalent magnesium salt and since the reaction does not proceed rapidly in the cold, it is desirable that a certain amount of the heat of reaction be retained and that toward the end of the reaction the temperature be raised above the melting point of the hydrated magnesium nitrate in order to render exact neutralization easier. In carrying out my method the temperature of the reacting mass may be desirably maintained at about 150° F.– 160° F. and such may be readily accomplished by control of the temperature of reaction, which normally reaches 180° F.–190° F., through cooling, for example, with a regulated flow of water. Toward the end of the reaction the temperature should be raised to say about 200° F., which may be accomplished by utilizing steam to supply the necessary additional heat.

When the reaction is complete, or in other words, when complete neutrality is attained, which may be determined by the fact that the solution turns from greenish brown to brown, or by testing with litmus, the solution is allowed to settle and is then run through a filter cloth, or the impurities otherwise removed, into a shallow crystallizing pan where on cooling it crystalizes into a hard cake of hydrated magnesium nitrate $Mg(NO_3)2.6H_2O$, which may be ground for use.

As a more specific example of the carrying out of the method according to my invention for the production of magnesium nitrate, to fourteen liters of commercial dilute nitric acid containing 63.22% $HNO_3$, diluted with water to a concentration of 58.40% $HNO_3$, there is added, with agitation, four pounds of finely ground commercial grade magnesium oxide. The mass, the temperature of which tends to rise to 180° F.–190° F. as the magnesium oxide is added, is cooled, as by a flow of water through a suitable coil in contact with the mass, in order to maintain a temperature of about 160° F. which is held until almost all the magnesium oxide is added. When the addition of the magnesium oxide is about complete the temperature of the mass is raised to about 200° F., as by substituting steam for water in the cooling coil, at which temperature the mass is held and further finely ground magnesium oxide added slowly until neutrality is attained. The theoretical amount of magnesium oxide required for neutralization of the acid in the above example is about nine pounds and, as has been indicated, the attainment of neutrality of the mass may be determined by change in color from greenish brown to brown, or by testing with litmus.

The reaction may be set out as follows:

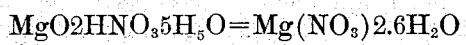

$MgO2HNO_35H_2O = Mg(NO_3)2.6H_2O$

When the reaction is complete the solution or melt is permitted to settle for about five minutes and then run through a filter cloth, or the impurities otherwise removed, into a shallow crystallization pan. The hydrated magnesium nitrate will crystallize into a hard cake on cooling without the necessity for evaporating off any excess water, it being noted that the only requisite water to produce the water of crystallization of hydrated magnesium nitrate ($6H_2O$) is utilized. The cake may be subsequently ground for use.

The process according to my invention may be utilized, if desired, in connection with the production of double salts, one of which is a hydrated metal nitrate, as for example, ammonium nitrate-hydrated magnesium nitrate, ammonium nitrate-hydrated calcium nitrate, and the like. In the production of double salts, for example, ammonium nitrate-hydrated magnesium nitrate, a quantity of magnesium oxide, or carbonate, is placed in a tank and weak nitric acid, containing the amount of water necessary to provide the $6H_2O$ of the magnesium nitrate to be produced, added. After the addition of the weak nitric acid ammonia, in gaseous or liquid form, and nitric acid are introduced into the tank simultaneously at different points so as to maintain almost neutrality through the course of the neutralization. During the reaction the temperature should be controlled as in the case of the production of a hydrated metal nitrate alone.

When the reaction is complete as much as may be necessary of the solution of ammonium nitrate-magnesium nitrate should be evaporated and the solution then run into a kettle having revolving agitating arms and cooling jackets in which the double salts will crystallize simultaneously. Before the evaporation of any of the solution the insoluble impurities introduced either with the magnesium oxide or carbonate, as silica, etc., should be settled out of the combined solution.

It will be understood that in accordance with my invention various hydrated nitrates other than hydrated magnesium nitrate may be produced, as indicated, by the use of, for example, an oxide, a hydroxide, a carbonate, or the like of, for example, calcium, iron, aluminum, or the like, instead of magnesium.

It will now be noted that according to the method involving my invention, I produce hydrated metal nitrates in crystalline form without the necessity for the evaporation of excess water and in a manner which is relatively inexpensive and at the same time productive of a product of desirable grade and characteristics.

It will be understood that where in the claims appended hereto I refer to a metal oxide, that I intend to include hydroxides of metals as equivalents.

Having now fully described my invention, what I claim and desire to protect by Letters Patent is:—

1. The method of producing hydrated metal nitrates, which includes admixing nitric acid, a metal salt of a weak acid and water in an amount substantially equal to the water of crystallization of the hydrated metal nitrate produced and cooling to effect crystallization of the metal nitrate.

2. The method of producing hydrated metal nitrates, which includes admixing nitric acid, a metal salt of a weak acid in quantity sufficient to just neutralize the nitric acid and water in an amount substantially equal to the water of crystallization of the hydrated metal nitrate produced and cooling to effect crystallization of the metal nitrate.

3. The method of producing hydrated metal nitrates, which includes admixing a metal salt of a weak acid and nitric acid dissolved in water substantially equal in amount to the water of crystallization of the metal nitrate, permitting the mixture to react and cooling to effect crystallization of the metal nitrate.

4. The method of producing hydrated metal nitrates, which includes admixing a metal oxide which will form a nitrate and nitric acid diluted with an amount of water substantially equal to the water of crystallization of the metal nitrate and cooling after the neutralization of the nitric acid to effect crystallization of the metal nitrate.

5. The method of producing hydrated metal nitrates, which includes adding to a quantity of nitric acid diluted with an amount of water substantially equal to the water of crystallization of the metal nitrate produced a metal oxide which will form a nitrate in quantity to just neutralize the nitric acid and cooling the mass when the nitric acid is neutralized.

6. The method of producing hydrated metal nitrates, which includes adding to a quantity of nitric acid diluted with an amount of water substantially equal to the water of crystallization of the metal nitrate produced magnesium oxide in quantity to just neutralize the nitric acid, abstracting heat from the reacting mass during the major portion of the reaction period and cooling the mass after the nitric acid is neutralized to effect crystallization of magnesium nitrate.

7. The method of producing hydrated metal nitrates, which includes adding to a quantity of nitric acid diluted with an amount of water substantially equal to the water of crystallization of the metal nitrate produced magnesium oxide in quantity to just neutralize the nitric acid, abstracting heat from the reacting mass during the major portion of the reaction period, raising the temperature of the reacting mass at the end of the reaction period to facilitate complete neutralization of the mass and cooling the mass on completion of the reaction to effect crystallization of magnesium nitrate.

8. The method of producing hydrated magnesium nitrate, which includes admixing nitric acid, a magnesium salt of a weak acid and water in an amount substantially equal to the amount represented by the $6H_2O$ of the hydrated magnesium nitrate produced and cooling to effect crystallization of the magnesium nitrate.

9. The method of producing hydrated magnesium nitrate, which includes admixing nitric acid, a magnesium salt of a weak acid in quantity sufficient to substantially neutralize the nitric acid and water in an amount equal to the amount represented by $6H_2O$ of the hydrated magnesium nitrate produced and cooling to effect crystallization of magnesium nitrate.

10. The method of producing hydrated magnesium nitrate, which includes admixing magnesium oxide and nitric acid diluted with an amount of water substantially equal to the $6H_2O$ of the magnesium nitrate and cooling after neutralization of the nitric acid to effect crystallization of magnesium nitrate.

11. The method of producing hydrated magnesium nitrate, which includes adding to a quantity of nitric acid diluted with an amount of water substantially equal to the $6H_2O$ of the magnesium nitrate produced, magnesium oxide in quantity to just neutralize the nitric acid and cooling the mass when the nitric acid is neutralized.

12. The method of producing hydrated magnesium nitrate, which includes adding to a quantity of nitric acid diluted with an amount of water substantially equal to the $6H_2O$ of the magnesium nitrate produced magnesium oxide in quantity to just neutralize the nitric acid and maintaining the reacting mass at a temperature of about 160° F. during the major portion of the reaction period and cooling the mass after the nitric acid is neutralized to effect crystallization of magnesium nitrate.

13. The method of producing hydrated magnesium nitrate, which includes adding to a quantity of nitric acid diluted with an amount of water substantially equal to the $6H_2O$ of the magnesium nitrate produced magnesium oxide in quantity to just neutralize the nitric acid, maintaining the reacting mass at a temperature of about 160° F. during the major portion of the reaction period, raising the temperature of the reacting mass at the end of the reaction period to facilitate complete neutralization of the mass and cooling the mass on completion of the reaction to effect crystallization of magnesium nitrate.

14. The method of producing a hydrated magnesium nitrate, which includes admixing nitric acid with a magnesium salt and water in amount substantially equal to the water of crystallization of the hydrated magnesium nitrate produced, and cooling to effect crystallization of the magnesium nitrate.

In testimony of which invention, I have hereunto set my hand at Wilmington, Delaware, on this 28th day of September, 1927.

ARTHUR L. MOHLER.